United States Patent
Kato et al.

(10) Patent No.: US 8,659,824 B2
(45) Date of Patent: Feb. 25, 2014

(54) LASER MICROSCOPE

(71) Applicant: Olympus Corporation, Tokyo (JP)

(72) Inventors: Jun Kato, Nagano (JP); Hiroshi Sasaki, Tokyo (JP); Yujin Arai, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/801,899

(22) Filed: Mar. 13, 2013

(65) Prior Publication Data

US 2013/0250391 A1     Sep. 26, 2013

(30) Foreign Application Priority Data

Mar. 23, 2012    (JP) .................................. 2012-067357

(51) Int. Cl.
    *G02B 21/06*    (2006.01)
(52) U.S. Cl.
    USPC .......................................... 359/385; 359/238
(58) Field of Classification Search
    USPC .................................................. 359/238, 385
    See application file for complete search history.

(56) References Cited

U.S. PATENT DOCUMENTS 7,326,899 B2 *    2/2008    Ri ............................... 250/201.3

FOREIGN PATENT DOCUMENTS

JP        2011-133580 A    7/2011

* cited by examiner

*Primary Examiner* — James Jones
(74) *Attorney, Agent, or Firm* — Holtz, Holtz, Goodman & Chick (57) ABSTRACT

A laser microscope includes an objective lens that radiates a laser beam onto a specimen; a stimulation optical system having an LCOS-SLM located at a position optically conjugate with the pupil position of the objective lens and which modulates the phase of the laser beam; and an observation optical system having a galvanometer mirror that scans the laser beam across the specimen, as observation illuminating light, and a PMT that detects the observation light coming from the specimen and collected by the objective lens. A control unit forms a three-dimensional image of the specimen and sets, in that image, stimulation sites in the specimen to be irradiated with a laser beam serving as a stimulation beam by the stimulation optical system at a plurality of different positions in the optical axis direction. The LCOS-SLM modulates the laser beam such that the stimulation sites are irradiated with the laser beam.

16 Claims, 5 Drawing Sheets

LASER MICROSCOPE

CROSS-REFERENCE TO RELATED APPLICATIONS

This application is based on Japanese Patent Application No. 2012-067357, the contents of which are incorporated herein by reference.

TECHNICAL FIELD

The present invention relates to a laser microscope.

BACKGROUND ART

In a known microscope system in the related art, the wavefront of a laser beam is freely changed to arbitrarily control the spatial distribution and intensity thereof by controlling the phase of a coherent light source with a spatial light modulator (SLM), and a laser beam having desired spatial distribution and intensity is radiated onto a specimen (for example, see PTL 1).

In the microscope system disclosed in PTL 1, an SLM is built into the microscope. By controlling the wavefront of a laser beam such that it cancels out aberrations generated by an objective lens and the microscope optical system, the laser beam can form a spot at an arbitrary position in a specimen.

CITATION LIST

Patent Literature
{PTL 1}
Japanese Unexamined Patent Application, Publication No. 2011-133580

SUMMARY OF INVENTION

Technical Problem

However, PTL 1 does not disclose how, using the SLM, to set a plurality of stimulation sites in a specimen to be simultaneously stimulated.

The present invention provides a laser microscope that enables a plurality of stimulation sites in a specimen to be easily set, allowing the stimulation sites to be simultaneously stimulated with light.

Solution to Problem

An aspect of the present invention is a laser microscope including: an objective lens that radiates a laser beam emitted from a laser light source onto a specimen; a stimulation optical system having a phase-modulating spatial light modulator that is located at a position optically conjugate with a pupil position of the objective lens and modulates the phase of the laser beam emitted from the laser light source; an observation optical system having a scanning unit that scans the laser beam emitted from the laser light source, serving as observation illuminating light, across the specimen and a detecting unit that detects the observation light coming from the specimen and collected by the objective lens; an image forming unit that forms a three-dimensional image of the specimen from observation images of different observation planes in the optical axis direction, acquired by the observation optical system; and a position setting unit that sets stimulation sites in the specimen to be irradiated with the laser beam serving as a stimulation beam by the stimulation optical system at a plurality of different positions in the optical axis direction, in the three-dimensional image formed by the image forming unit. The spatial light modulator modulates the laser beam such that the stimulation sites set by the position setting unit are irradiated with the laser beam.

With this aspect, the stimulation optical system modulates the phase of the laser beam emitted from the laser light source with the spatial light modulator and radiates the laser beam onto the specimen through the objective lens, thereby stimulating positions in the specimen irradiated with the laser beam. Furthermore, the observation optical system scans the laser beam emitted from the laser light source with the scanning unit, radiates the laser beam onto the specimen through the objective lens, and detects the observation light coming from the specimen irradiated with the laser beam with the detecting unit, thereby forming a three-dimensional image of the specimen with the image forming unit. Thus, it is possible to three-dimensionally observe the specimen in the image.

In this case, by modulating the phase of the laser beam with the spatial light modulator, the laser-beam intensity distribution pattern on the specimen can be changed. Furthermore, by setting, with the position setting unit, stimulation sites in the specimen to be stimulated by the stimulation optical system at a plurality of different positions in the optical axis direction in the three-dimensional image in an area over which the laser beam is scanned across the specimen by the observation optical system, a plurality of desired stimulation sites can be simultaneously irradiated with the laser beam simply by modulating the phase of the laser beam with the spatial light modulator corresponding to the stimulation sites in the image.

Accordingly, it is possible to easily set a plurality of stimulation sites in the specimen and to simultaneously irradiate the respective stimulation sites with the laser beam. The three-dimensional image formed by the image forming unit includes not only a three-dimensionally displayed image, but also a collection of two-dimensional images having three-dimensional image information displayed in a frame-sequential manner or side-by-side.

In the above-described aspect, the laser microscope may further include an association correction unit that controls the phase modulation of the laser beam performed by the spatial light modulator such that an irradiation pattern, on the specimen, of the laser beam radiated by the stimulation optical system substantially matches a desired irradiation pattern set by the position setting unit.

With this configuration, it is possible to irradiate, with the stimulation optical system, the specimen with the laser beam having an irradiation pattern that substantially matches a desired radiation pattern set by the position setting unit, e.g., a desired pattern inputted by a user.

In the above-described aspect, the observation optical system or a specimen-image acquisition unit provided separately therefrom may acquire an observation image of the specimen irradiated with the laser beam having a predetermined irradiation pattern generated by the spatial light modulator, and the association correction unit may control the phase modulation of the laser beam performed by the spatial light modulator so as to cancel the difference between the predetermined irradiation pattern radiated onto the specimen and the irradiation pattern on the acquired observation image.

With this configuration, an image of the specimen irradiated with a laser beam having a predetermined irradiation pattern by the stimulation optical system is acquired. Because the association correction unit corrects the amount of phase modulation performed by the spatial light modulator on the basis of the comparison between the laser-beam intensity distribution pattern and the predetermined irradiation pattern on the acquired image, it is possible to make the laser beam radiated onto the specimen by the stimulation optical system substantially match the predetermined intensity distribution pattern.

In the above-described aspect, the laser microscope may further include an aberration correcting unit that controls the phase modulation of the laser beam performed by the spatial light modulator so as to correct aberrations of the objective lens, aberrations of an optical system disposed between the objective lens and the spatial light modulator, and/or the influence of a refractive index mismatch of the specimen.

If there is an influence of aberrations of the objective lens, aberrations of the other optical system, or a refractive index mismatch of the specimen, the shape of a laser beam spot may be deformed or the diameter of the laser beam spot may exceed a value calculated from the diffraction limit. With this configuration, it is possible to avoid a disadvantage resulting from the influence of aberrations of the objective lens, aberrations of the other optical system, or a refractive index mismatch of the specimen and to simultaneously stimulate a plurality of stimulation sites in the specimen.

In the above-described aspect, a stimulation light path of the stimulation optical system in which the spatial light modulator is disposed and an observation light path of the observation optical system in which the scanning unit is disposed may be separately provided, and the laser microscope may further include an optical-path combining portion that combines the stimulation light path and the observation light path to allow the laser beam emitted from the stimulation optical system and the laser beam emitted from the observation optical system to enter the same objective lens.

With this configuration, it is possible to combine, by the optical-path combining portion, the laser beam passing through the stimulation light path of the stimulation optical system and the laser beam passing through the observation light path of the observation optical system, which are generated from different laser light sources, and to simultaneously radiate the laser beams onto the specimen. Accordingly, it is possible to simultaneously perform stimulation of the specimen with light by the stimulation optical system and observation of the specimen with the observation optical system.

In the above-described aspect, the laser microscope may further include a specimen-image acquisition unit that acquires a two-dimensional image of the specimen by capturing an image of the observation light coming from the specimen and collected by the objective lens.

With this configuration, it is possible to easily acquire, with the specimen-image acquisition unit, an image of the specimen irradiated with the laser beam by the stimulation optical system.

In the above-described aspect, the association correction unit may associate the depth position, in the specimen, of the laser beam radiated by the stimulation optical system and the depth position in the three-dimensional image of the specimen irradiated with the laser beam and acquired by the observation optical system.

With this configuration, it is possible to associate, with the association correction unit, the coordinates on the image of the specimen acquired by the observation optical system and the irradiation position of the laser beam radiated by the stimulation optical system onto the specimen, at different depth-wise positions in the specimen.

In the above-described aspect, the association correction unit may have an association table in which the depth position in the specimen radiated by the stimulation optical system and the depth position in the three-dimensional image of the specimen irradiated with the laser beam and acquired by the observation optical system are associated with each other for each wavelength of the laser beam, and the phase modulation performed by the spatial light modulator may be controlled in accordance with the association table for each wavelength of the laser beam.

With this configuration, even if the wavelength of the laser beam is changed, it is possible to associate the depth position, in the specimen, of the laser beam radiated by the stimulation optical system and the depth position in the three-dimensional image of the specimen obtained by radiating the laser beam with the observation optical system and to radiate, with the same intensity, the laser beam onto a plurality of stimulation sites set in the three-dimensional image of the specimen and located at different depth positions.

In the above-described aspect, the laser microscope may further include an intensity setting unit that can set the intensity of the laser beam radiated by the stimulation optical system for each of the plurality of stimulation sites set by the position setting unit.

With this configuration, it is possible to set the intensity of the laser beam for each of the stimulation sites in the specimen with the intensity setting unit. Accordingly, it is possible to perform observation by associating the stimulation beam intensity and the response of the specimen.

In the above-described aspect, the intensity setting unit may adjust the intensity of the laser beam such that the specimen is stimulated with the same intensity, regardless of the depth of the position irradiated with the laser beam.

With this configuration, by using the intensity setting unit, it is possible to stimulate a plurality of sites located at different depths in the specimen with the laser beam having the same intensity.

In the above-described aspect, the intensity setting unit may include a memory portion that stores an attenuation function according to which the laser beam radiated onto the specimen is attenuated and an output adjustment portion that adjusts the output of the laser light source according to the attenuation function stored in the memory portion.

With this configuration, simply by correcting the coefficient of the attenuation function according to the state and type of the specimen, the intensity of the laser beam can be easily adjusted such that the specimen can be stimulated with the same intensity, regardless of the depth of the laser beam irradiation position.

In the above-described aspect, the intensity setting unit may include a memory portion that stores a table of a scattering coefficient and absorption coefficient of the laser beam with respect to the depth in the specimen and an output adjustment portion that adjusts the output of the laser light source according to the table stored in the memory portion.

With this configuration, when the same specimen is continuously observed, a table can be formed accurately and easily. Furthermore, this is advantageous when it is difficult to make a function.

In the above-described aspect, the laser light source may be an infrared pulsed laser.

In the above-described aspect, a laser microscope may include an objective lens that radiates a laser beam emitted from a laser light source onto a specimen; a stimulation optical system having a stimulation light path in which a phase-modulating spatial light modulator that is located at a position optically conjugate with a pupil position of the objective lens and modulates the phase of the laser beam emitted from the laser light source is disposed; an observation optical system having an observation light path in which a scanning unit that scans a laser beam emitted from the laser light source, serving as observation illuminating light, across the specimen is disposed and a detecting unit that detects the observation light coming from the specimen and collected by the objective lens; an optical-path combining portion that combines the stimulation light path and the observation light path to allow the laser beams from the stimulation optical system and the laser beam from the observation optical system to enter the same objective lens; an image forming unit that forms a three-dimensional image of the specimen from observation images of different observation planes in the optical axis direction, acquired by the observation optical system; a position setting unit that sets, in the three-dimensional image formed by the image forming unit, stimulation sites in the specimen to be irradiated with the laser beam serving as a stimulation beam by the stimulation optical system at a plurality of different positions in the optical axis direction; and an association correction unit that controls the phase modulation of the laser beam performed by the spatial light modulator such that an irradiation pattern, on the specimen, of the laser beam radiated by the stimulation optical system substantially matches a desired irradiation pattern set by the position setting unit. The spatial light modulator may modulate the laser beam such that the stimulation sites set by the position setting unit are irradiated with the laser beam.

In the above-described aspect, the stimulation optical system may include a stimulation-beam scanning unit that is provided in the stimulation light path and scans the laser beam serving as the stimulation beam across the specimen.

In the above-described aspect, the observation optical system may activate the scanning unit to detect light from the specimen irradiated with the laser beam in a predetermined irradiation pattern generated by the spatial light modulator, thereby acquiring an observation image of the specimen irradiated with the predetermined irradiation pattern, and the association correction unit may control the phase modulation of the laser beam performed by the spatial light modulator so as to cancel the difference between the predetermined irradiation pattern radiated onto the specimen and the irradiation pattern on the acquired observation image.

Advantageous Effects of Invention

The present invention provides an advantage in that a plurality of stimulation sites in a specimen can be easily set, and the stimulation sites can be simultaneously stimulated with light.

DESCRIPTION OF EMBODIMENTS

First Embodiment

A laser microscope according to a first embodiment of the present invention will be described below with reference to the drawings.

Figure 1:
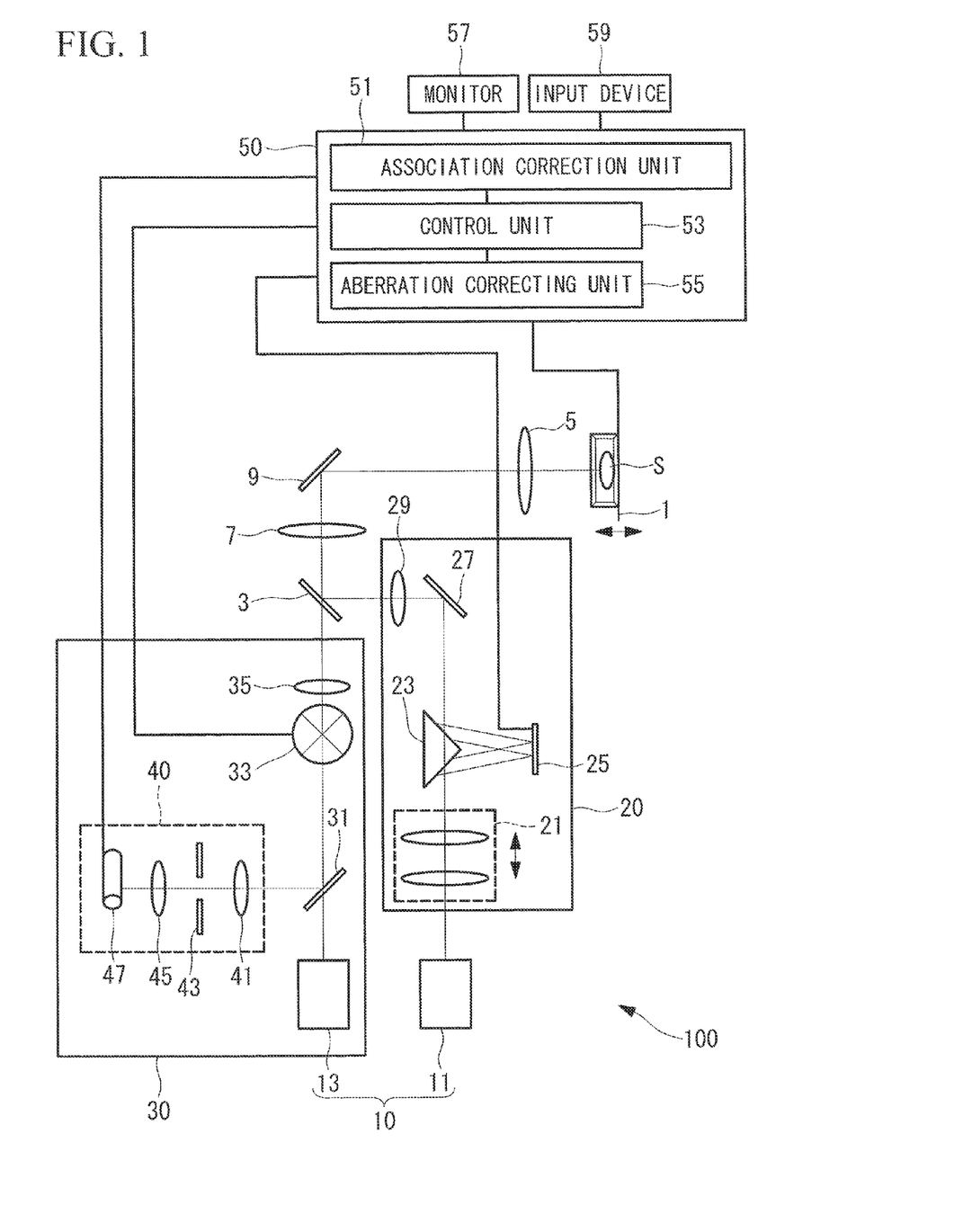
FIG. 1 is a schematic diagram of the configuration of a laser microscope according to a first embodiment of the present invention.

As shown in FIG. 1, a laser microscope 100 according to this embodiment includes a stage 1 on which a specimen S is disposed; a laser light source portion (laser light source) 10 that emits a laser beam; a stimulation optical system 20 that stimulates the specimen S with light; an observation optical system 30 with which the specimen S is observed; an optical-path combining portion 3, such as a dichroic mirror, that combines the optical path of the stimulation optical system 20 (stimulation light path) and the optical path of the observation optical system 30 (observation light path); an objective lens 5 that radiates the laser beam onto the specimen S and collects the returning beam from the specimen S; a control device 50; a monitor 57; and an input device 59, such as a keyboard. In FIG. 1, reference numeral 7 denotes an image-forming lens, and reference numeral 9 denotes a mirror.

The stage 1 is movable in the optical axis direction of the objective lens 5 and is connected to the control device 50. The stage 1 is controlled by the control device 50. Furthermore, position information of the stage 1 in the optical axis direction is sent to the control device 50.

The laser light source portion 10 includes a laser light source 11 that emits a laser beam for stimulating the specimen S (hereinbelow, "stimulation beam") and a laser light source 13 that emits a laser beam for exciting the specimen S (hereinbelow, "excitation beam") to make it generate fluorescence. The laser light source 11 is provided in the stimulation optical system 20, and the laser light source 13 is provided in the observation optical system 30.

The stimulation optical system 20 includes a beam expander 21 that can adjust the beam diameter of the stimulation beam emitted from the laser light source 11; a right-angled prism 23 that reflects the stimulation beam; a spatial light phase modulator capable of modulating the phase of the stimulation beam (i.e., a phase-modulating spatial light modulator: liquid-crystal-on-silicon spatial light modulator; hereinbelow, "LCOS-SLM") 25; a mirror 27 that reflects the stimulation beam after phase modulation by the LCOS-SLM 25; and a pupil projection lens 29, serving as a relay lens, that allows the stimulation beam reflected by the mirror 27 to enter the optical-path combining portion 3 and form an image in front of the image-forming lens 7.

For example, an infrared pulsed laser that emits an ultrashort pulsed laser beam in the infrared region (stimulation beam) may be used as the laser light source 11.

The right-angled prism 23 reflects the stimulation beam, emitted from the laser light source 11 and incident thereon through the beam expander 21, toward the LCOS-SLM 25 and reflects the stimulation beam returning from the LCOS-SLM 25 toward the mirror 27.

The LCOS-SLM 25 is located at a position conjugate with the pupil position of the objective lens 5 and is connected to the control device 50. The LCOS-SLM 25, under the control of the control device 50, reflects the stimulation beam incident thereon after changing the wavefront shape thereof by phase modulation. Thus, the LCOS-SLM 25 can three-dimensionally change the intensity distribution of the stimulation beam on the specimen S and irradiate the specimen S with a stimulation beam having a desired three-dimensional pattern.

The three-dimensional pattern includes two or more spots located at different positions in the optical axis direction of the stimulation beam. With this configuration, it is possible to radiate a stimulation beam into, for example, one point on the specimen S or to simultaneously radiate stimulation beams into multiple points on the specimen S located three-dimensionally in the X, Y, and Z directions.

The observation optical system 30 includes a dichroic mirror 31 that allows an excitation beam emitted from the laser light source 13 to pass therethrough and reflects fluorescence coming from the specimen S; a galvanometer mirror (scanning unit) 33 that scans the excitation beam across the specimen S; a pupil projection lens 35, serving as a relay lens, that allows the excitation beam scanned by the galvanometer mirror 33 to enter the optical-path combining portion 3 and form an image in front of the image-forming lens 7; and a detection optical system 40 that detects fluorescence coming from the specimen S.

The laser light source 13 emits the excitation beam, which is, for example, a visible laser beam having a wavelength different from that of the laser beam emitted from the laser light source 11.

The galvanometer mirror 33 is connected to the control device 50. Furthermore, the galvanometer mirror 33 includes a pair of mirrors (not shown) that can each swivel about a swivel axis perpendicular to the optical axis. The galvanometer mirror 33, under the control of the control device 50, can scan the excitation beam across the specimen S in the X and Y directions by reflecting the excitation beam while swiveling the pair of mirrors.

Furthermore, the galvanometer mirror 33 outputs a mirror-swivel-angle signal to the control device 50. It is desirable that the galvanometer mirror 33 be located at a position optically conjugate with the pupil position of the objective lens 5.

The detection optical system 40 includes a confocal lens 41 that collects the fluorescence reflected by the dichroic mirror 31, a confocal pinhole 43 that limits the beam of fluorescence collected by the confocal lens 41, a collimating lens 45 that transforms the fluorescence passing through the confocal pinhole 43 into a collimated beam, and a photomultiplier tube (PMT: detecting unit) 47 that detects the intensity of the fluorescence transformed into a collimated beam.

The confocal pinhole 43 is located at a position conjugate with an observation surface of the specimen and allows only the fluorescence coming from the observation surface to pass therethrough, while removing the fluorescence coming from the other layers.

The PMT 47 outputs a detection signal of the detected fluorescence to the control device 50. It is desirable that the PMT 47 be located at a position optically conjugate with the pupil position of the objective lens 5.

The control device 50 includes an association correction unit 51 that associates the position irradiated with the excitation beam by the observation optical system 30 with the position irradiated with the stimulation beam by the stimulation optical system 20, a control unit (image forming unit, position setting unit) 53 that controls the stimulation optical system 20 and the observation optical system 30 and processes an image of the specimen S, and an aberration correcting unit 55 that corrects aberrations of the objective lens 5.

The association correction unit 51 controls the phase modulation of the stimulation beam performed by the LCOS-SLM 25 such that the pattern on the image of the specimen S irradiated with the stimulation beam from the stimulation optical system 20 after the phase thereof is modulated by the LCOS-SLM 25 substantially matches the pattern on the image of the specimen S irradiated with the excitation beam from the observation optical system 30, scanned by the galvanometer mirror 33.

The control unit 53 controls the acquisition of an image of the specimen S irradiated with the excitation beam by the observation optical system 30 and the timing of light stimulation applied to the specimen S irradiated with the stimulation beam by the stimulation optical system 20 by synchronizing the refresh timing of the LCOS-SLM 25 and the control of the galvanometer mirror 33 and the PMT 47.

The control unit 53 can also form a three-dimensional image of the specimen S by synchronizing scanning of the excitation beam using the galvanometer mirror 33 with the detection of fluorescence using the PMT 47 on the basis of position information of the stage 1 in the optical axis direction sent from the stage 1, the mirror-swivel-angle signal sent from the galvanometer mirror 33, and a fluorescence detection signal sent from the PMT 47.

The control unit 53 can also display the formed image of the specimen S on the monitor 57. The control unit 53 can set, in the three-dimensional image of the specimen S displayed on the monitor 57, stimulation sites in the specimen S to be stimulated with light by the stimulation optical system 20, in other words, the positions to be irradiated with the stimulation beams, which are input by a user using the input device 59, at a plurality of different positions in the optical axis direction.

The aberration correcting unit 55 can store aberration data about aberrations of the objective lens 5 caused by design or manufacturing errors in association with the objective lens 5. The aberration correcting unit 55 generates a phase modulation signal to be inputted to the LCOS-SLM 25 so as to correct the influence of aberrations of the objective lens 5 on the basis of the data about the aberrations of the objective lens 5.

The operation of the thus-configured laser microscope 100 will be described.

First, a case where the specimen S is stimulated with light using the laser microscope 100 according to this embodiment will be described.

When the specimen S is stimulated by the stimulation optical system 20, first, a stimulation beam is emitted from the laser light source 11, and the beam diameter thereof is adjusted by the beam expander 21 so as to conform to the size of the LCOS-SLM 25. After the beam diameter is adjusted by the beam expander 21, the stimulation beam is reflected by the right-angled prism 23 and is incident on the LCOS-SLM 25 in the form of a collimated beam.

The stimulation beam incident on the LCOS-SLM 25 is returned to the right-angled prism 23 after the phase thereof is modulated and the wavefront shape thereof is changed. The stimulation beam returned to the right-angled prism 23 is reflected toward the mirror 27 and is incident on the optical-path combining portion 3 through the pupil projection lens 29. The stimulation beam incident on the optical-path combining portion 3 is reflected and passes along the optical path shared with the observation optical system 30 and is incident on the objective lens 5 via the image-forming lens 7 and the mirror 9.

The stimulation beam incident on the objective lens 5 is radiated onto the specimen S in a desired pattern formed as a result of phase modulation by the LCOS-SLM 25. Thus, the specimen S is stimulated in accordance with the irradiation pattern of the stimulation beam.

Next, a case where the specimen S is observed using the laser microscope 100 according to this embodiment will be described.

When the specimen S is observed by the observation optical system 30, first, an excitation beam is emitted from the laser light source 13 and is made to incident on the galvanometer mirror 33 through the dichroic mirror 31. The excitation beam incident on the galvanometer mirror 33 is deflected by the pair of mirrors in the direction corresponding to the scanning position on the specimen S and is incident on the optical-path combining portion 3 through the pupil projection lens 35.

The excitation beam incident on the optical-path combining portion 3 passes therethrough, passes along the optical path shared with the stimulation optical system 20, and is radiated onto the specimen by the objective lens 5 via the image-forming lens 7 and the mirror 9. Thus, the excitation beam is scanned across the specimen S in accordance with the swivel angles of the pair of mirrors of the galvanometer mirror 33.

When fluorescence is generated at the scanning position on the specimen S upon irradiation with the excitation beam, the fluorescence is collected by the objective lens 5, returns along the optical path of the excitation beam via the mirror 9, the image-forming lens 7, the optical-path combining portion 3, the pupil projection lens 35, and the galvanometer mirror 33, is reflected by the dichroic mirror 31, and enters the detection optical system 40.

The fluorescence entering the detection optical system 40 is collected by the confocal lens 41 and is transformed into a collimated beam by the collimating lens 45, after the beam diameter thereof is limited by the confocal pinhole 43. Then, the fluorescence intensity is detected by the PMT 47. When the fluorescence intensity is detected by the PMT 47, the fluorescence detection signal is sent to the control device 50, together with the mirror-swivel-angle signal sent from the galvanometer mirror 33. Furthermore, the position information of the stage 1 in the optical axis direction sent from the stage 1 is also sent to the control device 50. In the control unit 53, a three-dimensional image of the specimen S is formed on the basis of the fluorescence detection signal, the mirror-swivel-angle signal, and the position information of the stage 1 in the optical axis direction.

Next, a case where light stimulation of the specimen S by the stimulation optical system 20 and observation of the specimen S by the observation optical system 30 are performed in an associated manner such that misalignment between the radiation positions is reduced will be described.

When light stimulation of the specimen S by the stimulation optical system 20 and observation of the specimen S by the observation optical system 30 are performed in an associated manner, first, a mirror is disposed at a position on the stage 1 where the specimen should be disposed (hereinbelow, "mirror specimen": not shown), and then, using the stimulation optical system 20, a stimulation beam is emitted from the laser light source 11, the phase thereof is modulated by the LCOS-SLM 25, and a grid having a predetermined pattern is radiated onto the mirror specimen.

In this state, using the observation optical system 30, the mirror specimen is dummy scanned by swiveling the pair of mirrors in the same way as when scanning the specimen S but without generating an excitation beam to acquire an image of the specimen S radiated with the stimulation beam using the control unit 53. Then, phase modulation by the LCOS-SLM 25 is controlled by the association correction unit 51 such that the pattern on the image of the specimen S formed by the control unit 53 matches the predetermined pattern, in other words, such that the difference between the irradiation pattern on the image of the specimen S and the predetermined irradiation pattern is canceled out. The phase modulation settings when the pattern on the image of the specimen S matches the predetermined pattern are stored in the association correction unit 51.

Thus, the position, in the X and Y directions, irradiated with the excitation beam by the observation optical system 30 is associated with the position, in the X and Y directions, irradiated with the stimulation beam by the stimulation optical system 20.

The position, in the Z direction, irradiated with the excitation beam by the observation optical system 30 is associated with the position, in the Z direction, irradiated with the stimulation beam by the stimulation optical system 20 by open-loop control. Herein, "open-loop control" means control that uses the wavefront modulation value required by design, not the actual difference with respect to the image.

Next, the specimen S is disposed on the stage 1, and in the observation optical system 30, an excitation beam is emitted from the laser light source 13 and is scanned across the specimen S by the galvanometer mirror 33. The stage 1 is moved in the optical axis direction each time scanning across a two-dimensional surface is completed, thereby forming an XYZ stack image of the specimen S with the PMT 47 and the control unit 53. Then, the control unit 53 converts the XYZ stack image into a three-dimensional image (hereinbelow, "three-dimensional image") by using three-dimensional image forming software.

Next, the three-dimensional image of the specimen S is displayed on the monitor 57, and two or more stimulation sites in the specimen S are searched for while the three-dimensional image is increased or decreased in size, rotated, or moved with image-manipulating means (not shown). At this time, the three-dimensional image may be displayed in a semi-transparent state so that the internal structure thereof can be viewed, or the three-dimensional image may be sliced at an arbitrary position so that the portion to be observed can be easily found.

The stimulation sites in the specimen S found as a result of the above-described manipulation are input by the user using the input device 59 and are set in the three-dimensional image of the specimen S by the control unit 53. Next, the control unit 53 calculates the three-dimensional coordinates of the specimen S from the stimulation sites set as described above, and the calculated coordinate data is output to the aberration correcting unit 55. Then, a phase modulation signal for radiating a stimulation beam onto that coordinate position is generated by the aberration correcting unit 55 on the basis of the coordinate data sent from the control unit 53 and is sent to the LCOS-SLM 25. In this way, the phase modulation of the stimulation beam by the LCOS-SLM 25 is controlled.

In this case, by storing the objective lens 5 and the aberration data thereof in association with each other in the aberration correcting unit 55, a phase modulation signal that causes the stimulation beam to have a wavefront that cancels out aberrations generated by the objective lens 5 is generated by the aberration correcting unit 55. Thus, it is possible to correct the influence of aberrations of the objective lens 5.

Hence, in the stimulation optical system 20, when a stimulation beam is emitted from the laser light source 11, the LCOS-SLM 25 forms a pattern according to a plurality of desired stimulation sites set in the three-dimensional image of the specimen S acquired by the observation optical system 30, and the stimulation sites are simultaneously irradiated with stimulation beams. Thus, it is possible to simultaneously stimulate a plurality of stimulation sites in the specimen S and to observe the response thereto with the three-dimensional image of the specimen S acquired by the observation optical system 30.

As has been described above, with the laser microscope 100 according to this embodiment, by setting stimulation sites in the specimen S to be stimulated by the stimulation optical system 20 in the three-dimensional image of the specimen S acquired by the observation optical system 30, setting of the stimulation sites can be simplified. Furthermore, by associating the position irradiated with the excitation beam by the observation optical system 30 and the position irradiated with the stimulation beam by the stimulation optical system 20 by means of phase modulation of the stimulation beam by the LCOS-SLM 25, a plurality of desired stimulation sites set in the three-dimensional image of the specimen S acquired by the observation optical system 30 can be simultaneously irradiated with stimulation beams by the stimulation optical system 20.

In particular, by moving the stage 1 in the optical axis direction to associate the depth position, in the specimen S, of the stimulation beam emitted from the stimulation optical system 20 and the depth position, in the three-dimensional image of the specimen S, of the excitation beam emitted from the observation optical system 30, it is possible to observe observation positions at various depths with the observation optical system 30, while stimulating the same portion of the specimen S. Thus, it is possible to easily set a plurality of stimulation sites in the specimen S and to simultaneously apply light stimulation to the respective stimulation sites.

Furthermore, by correcting the influence of aberrations of the objective lens 5 with the aberration correcting unit 55, stimulation beams can be precisely radiated onto a plurality of stimulation sites. In addition, by separately providing the optical path of the observation optical system 30 and the optical path of the stimulation optical system 20, it is possible to simultaneously perform radiation of the excitation beam by the observation optical system 30 and radiation of the stimulation beam by the stimulation optical system 20 and to perform stimulation of the specimen S and observation of the response thereto without a time lag.

Although the stimulation sites are set after the XYZ stack image is converted into a three-dimensional image by using three-dimensional image forming software in this embodiment, it is also possible that, for example, an XY two-dimensional image acquired by the observation optical system 30 is displayed on the monitor (not shown), portions to be stimulated are searched for while the position thereof in the Z direction is changed, and the stimulation sites are set on the two-dimensional image with the control unit 53.

Although aberrations of the objective lens 5 are corrected by using the aberration correcting unit 55 in this embodiment, it is possible to correct not only aberrations of the objective lens 5, but also aberrations of the microscope optical system including the right-angled prism 23, the mirror 27, the pupil projection lens 29, the optical-path combining portion 3, the image-forming lens 7, and the mirror 9, as well as a refractive index mismatch of the specimen S.

In this embodiment, when a three-dimensional image is acquired, the stage 1 is moved in the optical axis direction each time scanning across a two-dimensional surface is completed. However, it is also possible that the stage 1 is fixed, and the objective lens 5, instead of the stage 1, is controlled by the control device 50 and is moved in the optical axis direction each time scanning across a two-dimensional surface is completed.

Second Embodiment

Next, a laser microscope according to a second embodiment of the present invention will be described.

Figure 2:
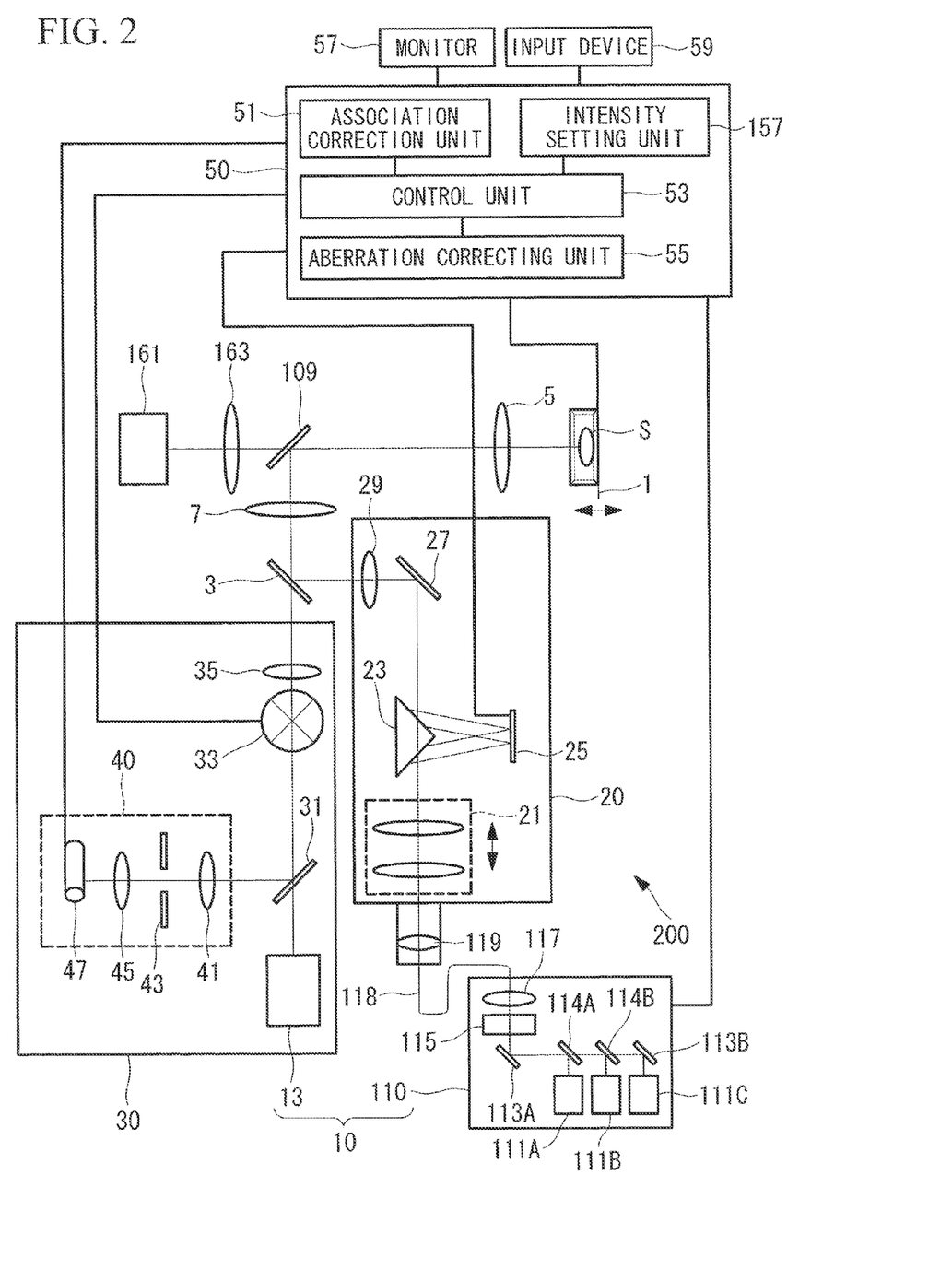
FIG. 2 is a schematic diagram of the configuration of a laser microscope according to a second embodiment of the present invention.

As shown in FIG. 2, a laser microscope 200 according to this embodiment differs from that according to the first embodiment in that the laser light source portion 10 has a laser light source device 110 instead of the laser light source 11 and in that it includes an intensity setting unit 157 that sets the intensity of a stimulation beam radiated by the stimulation optical system 20, a CCD camera (specimen-image acquisition unit) 161, an image-forming lens 163 provided in front of the CCD camera 161, and a half mirror 109 provided instead of the mirror 9.

Hereinbelow, portions that have the same configurations as those of the laser microscope 100 according to the first embodiment will be denoted by the same reference numerals, and descriptions thereof will be omitted.

The laser light source device 110 includes a plurality of laser light sources 111A, 111B, and 111C that emit visible laser beams (stimulation beams) having different wavelengths; mirrors 113A and 113B and dichroic mirrors 114A and 114B that combine the stimulation beams emitted from the laser light sources 111A, 111B, and 111C into a single optical path; an acousto-optic tunable filter (AOTF) 115 that can adjust the power of the stimulation beams combined into the single optical path; and a coupling lens 117 that collects the stimulation beams of the respective wavelengths.

Furthermore, the laser light source device 110 includes a single-mode fiber 118 that guides the stimulation beam collected by the coupling lens 117 to the stimulation optical system 20, and a collimating lens 119 that transforms the stimulation beam guided by the single-mode fiber 118 into a collimated beam and allows the beam to enter the beam expander 21.

A stimulation beam emitted from the laser light source 111A is reflected by the dichroic mirror 114A and enters the AOTF 115 via the mirror 113A. A stimulation beam emitted from the laser light source 111B is reflected by the dichroic mirror 114B, passes through the dichroic mirror 114A, and enters the AOTF 115 via the mirror 113A. A stimulation beam emitted from the laser light source 111C is reflected by the mirror 113B, passes through the dichroic mirrors 114B and 114A, and enters the AOTF 115 via the mirror 113A.

The light-intensity and wavelength of the stimulation beams made to pass through the AOTF 115 can be selected by the intensity setting unit 157.

The input device 59 allows a user to input a desired stimulation intensity and stimulation duration for the stimulation sites, set by the control unit 53, in the three-dimensional image of the specimen S displayed on the monitor 57. Furthermore, stimulation sites in the specimen S to be stimulated by the stimulation optical system 20 and an observation area in the specimen S to be observed by the observation optical system 30 can be inputted through the input device 59.

The intensity setting unit 157 controls the laser light source device 110 according to the stimulation intensity and stimulation duration for the respective stimulation sites inputted through the input device 59. This makes it possible to radiate stimulation beams having a relative intensity ratio or stimulation beams having the same stimulation intensity onto the respective stimulation sites in the specimen S, while varying the stimulation duration.

The half mirror 109 reflects fluorescence that comes from the specimen S irradiated with an excitation beam, is collected by the objective lens 5, and returns along the optical path of the excitation beam toward the image-forming lens 7, while allowing a reflected beam that is reflected at the specimen S irradiated with a stimulation beam and returns along the optical path of the stimulation beam to be transmitted therethrough.

The CCD camera 161 and the image-forming lens 163 are disposed between the objective lens 5 and the optical-path combining portion 3. The reflected beam passing through the half mirror 109 is focused by the image-forming lens 163, and an image is captured by the CCD camera 161.

The operation of the thus-configured laser microscope 200 according to this embodiment will be described.

This embodiment differs from the first embodiment, in which an image is acquired by dummy scanning the galvanometer mirror 33 of the observation optical system 30, in that the association correction unit 51 acquires, with the CCD camera 161, an association-correction image used to perform phase modulation of the LCOS-SLM 25. More specifically, in order to perform light stimulation of the specimen S by the stimulation optical system 20 and observation of the specimen S by the observation optical system 30 in an associated manner in the laser microscope 200 according to this embodiment, the respective pixels of the CCD camera 161 and the respective pixels, on the scanning side, of the observation optical system 30 are associated with one another in advance.

Then, similarly to the first embodiment, the mirror specimen is disposed on the stage 1. Then, a stimulation beam is emitted from the laser light source device 110 to radiate a grid having a predetermined pattern onto the mirror specimen. The stimulation beam radiated onto the mirror specimen is reflected, returns in the opposite direction along the optical path, is collected by the objective lens 5, passes through the half mirror 109, and is incident on the CCD camera 161 through the image-forming lens 7. As a result, the grid having a predetermined pattern is projected onto a light-receiving surface of the CCD 161, and the CCD camera 161 acquires an image of the stimulation beam grid.

Next, the association correction unit 51 controls the phase modulation performed by the LCOS-SLM 25 such that the pattern on the image of the specimen S acquired by the CCD camera 161 matches the predetermined pattern. Furthermore, the phase modulation settings when the pattern on the image of the specimen S matches the predetermined pattern are stored in the association correction unit 51.

Thus, the position, in the X and Y directions, irradiated with the excitation beam by the observation optical system 30 and the position, in the X and Y directions, irradiated with the stimulation beam by the stimulation optical system 20 are associated with each other. Accordingly, by setting stimulation sites in the three-dimensional image of the specimen S acquired by the observation optical system 30 with the control unit 53, it is possible to simultaneously radiate stimulation beams onto the stimulation sites with the stimulation optical system 20.

At this time, if the depth of the area observed by the observation optical system 30 is to be changed, the objective lens 5 or the stage 1 carrying the specimen S is moved in the optical axis direction. However, this varies the position in the specimen S irradiated with the stimulation beam by the stimulation optical system 20, corresponding to the amount of movement of the objective lens 5 or the stage 1. Hence, in order to acquire a three-dimensional image while maintaining the stimulation position at the initially set position in the specimen S, the phase of the stimulation beam is modulated by the LCOS-SLM 25 by the amount corresponding to the movement of the objective lens 5 or the stage 1 to return the stimulation position to the initial position.

In this embodiment, by setting the stimulation position in the specimen S stimulated by the stimulation optical system 20 and the observation area in the specimen S observed with the observation optical system 30 (XYZ area and slice width) using the input device 59, the phase modulation performed by the LCOS-SLM 25 is controlled by the association correction unit 51, and the position irradiated with the stimulation beam is maintained constant.

More specifically, when the position in the Z direction is changed by an amount corresponding to the slice width while the specimen S is irradiated with the stimulation beam by the stimulation optical system 20 and an image of the specimen S in the X and Y directions is acquired by the observation optical system 30, the LCOS-SLM 25 is controlled by the association correction unit 51 on the basis of the stimulation position in the specimen S stimulated by the stimulation optical system 20 and the observation area in the specimen S observed with the observation optical system 30, which are inputted through the input device 59, and the depth of the position irradiated with the stimulation beam is returned to the original depth by an amount corresponding to the slice width as a result of the phase modulation. In this manner, the stimulation position is maintained constant. Next, a second XY image is acquired by the observation optical system 30, and the same process is repeated up to the initially set Z position.

With this configuration, even if the depth of observation with the observation optical system 30 is changed, it is possible to prevent the position in the specimen S irradiated with the stimulation beam by the stimulation optical system 20 from varying, making it possible to constantly stimulate the same portion in the specimen S.

Next, a case where stimulation sites in the specimen S to be stimulated with light by the stimulation optical system 20 are irradiated with stimulation beams having different stimulation intensities or for different irradiation durations, by using the intensity setting unit 157, will be described. The stimulation intensities that can be set are determined by the number of stimulation sites; if the number of stimulation sites is ten, the maximum stimulation intensity for one stimulation site is 10% of the maximum output of the laser light source device 110, and if the number of stimulation sites is three, the maximum stimulation intensity for one stimulation site is 33% of the maximum output of the laser light source device 110.

First, when the respective stimulation sites are to be irradiated with the stimulation beams having a relative intensity ratio, for example, if three sites are to be stimulated, the stimulation intensities for the stimulation sites are set, using the input device 59, to 20%, 30%, and 50% of the maximum output of the laser light source device 110, so that the total stimulation intensity is 100%. The stimulation durations for the stimulation sites are set to, for example, one second, three seconds, and five seconds.

When the settings as described above are made, the phase modulation of the stimulation beam performed by the LCOS-SLM 25 is controlled by the association correction unit 51 such that spots having a relative intensity ratio are formed at the stimulation positions set as described above, and the laser light source device 110 is controlled by the intensity setting unit 157 as follows.

First, one second after the stimulation is started, irradiation of the stimulation site with the beam set to 20% is terminated. Then, the transmittance of the AOTF 115 is reduced by 20% from the initial transmittance thereof. Next, three seconds after the stimulation is started, irradiation of the stimulation site with the beam set to 30% is terminated. Then, the transmittance of the AOTF 115 is reduced by 50% from the initial transmittance thereof. Finally, five seconds after the stimulation is started, irradiation of the stimulation site with the beam set to 50% is terminated.

In this way, it is possible to irradiate the respective stimulation sites with stimulation beams having different intensities and to vary the duration for which the respective stimulation sites are stimulated.

This may be performed after the transmittance of the AOTF 115 is reduced to a desired value. By doing so, the damage to the specimen S can be reduced.

On the other hand, when the respective stimulation sites in the specimen S are to be irradiated with stimulation beams having the same intensity, for example, if three sites are to be stimulated, the stimulation intensity for each stimulation site is set to 33% of the maximum output of the laser light source device 110, using the input device 59. In this case too, the stimulation duration may be set for each stimulation site. For example, the stimulation durations for the stimulation sites are set to one second, three seconds, and five seconds.

When the settings as described above are made, the phase modulation of the stimulation beam performed by the LCOS-SLM 25 is controlled by the association correction unit 51 such that spots having the same stimulation intensity are formed at stimulation positions set as described above, and the laser light source device 110 is controlled by the intensity setting unit 157 as follows.

First, one second after the stimulation is started, irradiation of the first stimulation site is terminated. Then, the transmittance of the AOTF 115 is reduced to 66% from the initial transmittance thereof. Next, three seconds after the stimulation is started, irradiation of the second stimulation site is terminated. Then, the transmittance of the AOTF 115 is reduced to 33% from the initial transmittance thereof. Finally, five seconds after the stimulation is started, irradiation of the third stimulation site is terminated. In this way, it is possible to irradiate the respective stimulation sites with the stimulation beams having the same intensity and to vary the duration for which the respective stimulation sites are stimulated.

As has been described above, with the laser microscope 200 according to this embodiment, the image of the specimen S irradiated with the stimulation beam by the stimulation optical system 20 can be easily acquired by using the CCD 161. Therefore, by modulating the phase of the stimulation beam with the LCOS-SLM 25 on the basis of the stimulation-beam intensity distribution pattern on the image of the specimen S, acquired by the CCD 161, irradiated with the stimulation beam, it is possible to easily and quickly make the stimulation beam radiated by the stimulation optical system 20 onto the specimen S have a pattern having a predetermined intensity distribution. Furthermore, by setting the stimulation beam intensity for each stimulation site in the specimen S using the intensity setting unit 157, it is possible to perform observation by associating the stimulation beam intensity and the response of the specimen S.

Furthermore, by associating the depth position of the stimulation beam, in the specimen S, radiated by the stimulation optical system 20 and the depth position of the excitation beam, in the three-dimensional image of the specimen S, radiated by the observation optical system 30, it is possible to perform observation at different observation depths with the observation optical system 30, while stimulating the same portion of the specimen S.

In this embodiment, the specimen S irradiated with the excitation beam by the observation optical system 30 may be observed with the CCD 161. By doing so, the state of the specimen S after the stimulation can be more quickly visualized, compared with the case where the image is formed by the PMT 47 and the control unit 53.

Herein, if a plurality of stimulation sites in the specimen S located at different depths are to be stimulated with the same intensity, the stimulation intensity at a deep position tends to be lower than that at a shallow position because of the scattering and absorption in the specimen S. Hence, for example, a plurality of stimulation sites located at different depths may be stimulated with the same intensity by taking into consideration the influence of scattering and attenuation in the specimen S.

In this case, for example, the intensity setting unit 157 may include a memory portion (not shown) that stores an attenuation function according to which the stimulation beam radiated onto the specimen S is attenuated and an output adjustment portion (not shown) that adjusts the output of the laser light source device 110 according to the attenuation function stored in the memory portion.

The memory portion may store an attenuation function that includes, for example, the scattering coefficient and absorption coefficient of the specimen S.

Furthermore, the output adjustment portion may calculate, for each stimulation site, such a stimulation intensity that the stimulation beam is radiated with the same intensity as that in the stimulation site used as the reference for the stimulation intensity (hereinbelow, "reference stimulation site") on the basis of the three-dimensional coordinates of each stimulation site and the scattering coefficient and absorption coefficient of the specimen S stored in the memory portion. In addition, the stimulation intensity calculated for each stimulation site by the output adjustment portion may be sent to the aberration correcting unit 55. The output adjustment portion may increase the transmittance of the AOTF 115, if necessary.

When a plurality of stimulation sites located at different depths are to be stimulated with the same intensity by the laser microscope 200 according to this modification, first, the scattering coefficient and absorption coefficient of the specimen S are stored in the memory portion in advance, and, using the input device 59, the stimulation intensity for each stimulation site is set in percentages. For example, they may be set such that stimulation beams having a stimulation intensity of 10% of the maximum output of the laser light source device 110 are radiated onto all the stimulation sites. Furthermore, the reference stimulation site is selected.

The output adjustment portion calculates, for each stimulation site, such a stimulation intensity that the stimulation beam is radiated with the same intensity as that in the reference stimulation site on the basis of the three-dimensional coordinates of the respective stimulation sites and the scattering coefficient and absorption coefficient of the specimen S stored in the memory portion and sends the results to the aberration correcting unit 55. Then, the aberration correcting unit 55 generates a phase modulation signal corresponding to the stimulation intensity for each stimulation site inputted thereto and sends the signal to the LCOS-SLM 25, where the phase modulation is controlled. Furthermore, the output adjustment portion increases the transmittance of the AOTF 115, if necessary. As a result, the phase of the stimulation beam is modulated by the LCOS-SLM 25, and a plurality of stimulation sites in the specimen S are irradiated with stimulation beams having intensities that depend on the depth thereof.

With this configuration, simply by correcting the coefficient of the attenuation function according to the state and type of the specimen S, the stimulation beam intensity can be easily adjusted such that the specimen S can be stimulated with the same intensity, regardless of the depth of the position irradiated with the stimulation beam. Furthermore, the user can stimulate the respective stimulation sites with the same intensity without taking into consideration the attenuation of the stimulation beam due to scattering.

In this modification, the memory portion may store a table of the scattering coefficients and absorption coefficients of the stimulation beam with respect to the depth in the specimen S, and the output adjustment portion may adjust the output of the laser light source device 110 according to the table stored in the memory portion.

In this case, a table of the scattering coefficients and absorption coefficients with respect to the depth in the specimen S may be stored in the memory portion in advance.

Then, the output adjustment portion may calculate, for each stimulation site, such a stimulation intensity that the stimulation beam is radiated with the same intensity as that in the reference stimulation site on the basis of the three-dimensional coordinates of the respective stimulation sites and the table stored in the memory portion, and the transmittance of the AOTF 115 may be increased, if necessary. Then, the aberration correcting unit 55 may generate a phase modulation signal corresponding to the stimulation intensity for each stimulation site to control the phase modulation performed by the LCOS-SLM 25.

With this configuration, when the same specimen S is continuously observed, a table can be formed accurately and easily. Furthermore, this is advantageous when making a function is difficult.

Furthermore, in this embodiment, the association correction unit 51 may have an association table in which the position irradiated with the excitation beam by the observation optical system 30 and the position irradiated with the stimulation beam by the stimulation optical system 20 are associated with each other for each wavelength of the stimulation beam. In this case, upon selection of the wavelength of the stimulation beam radiated onto the specimen S using the input device 59, the association correction unit 51 may calculate the phase modulation value corresponding to the wavelength of the stimulation beam from the association table and send the result to the aberration correcting unit 55.

With this configuration, appropriate modulation corresponding to the wavelength of the stimulation beam used to stimulate the specimen S may be performed. Therefore, even if the wavelength of the stimulation beam is changed, the stimulation beam may be radiated onto the target position in the three-dimensional image of the specimen S acquired by the observation optical system 30.

Figure 3:
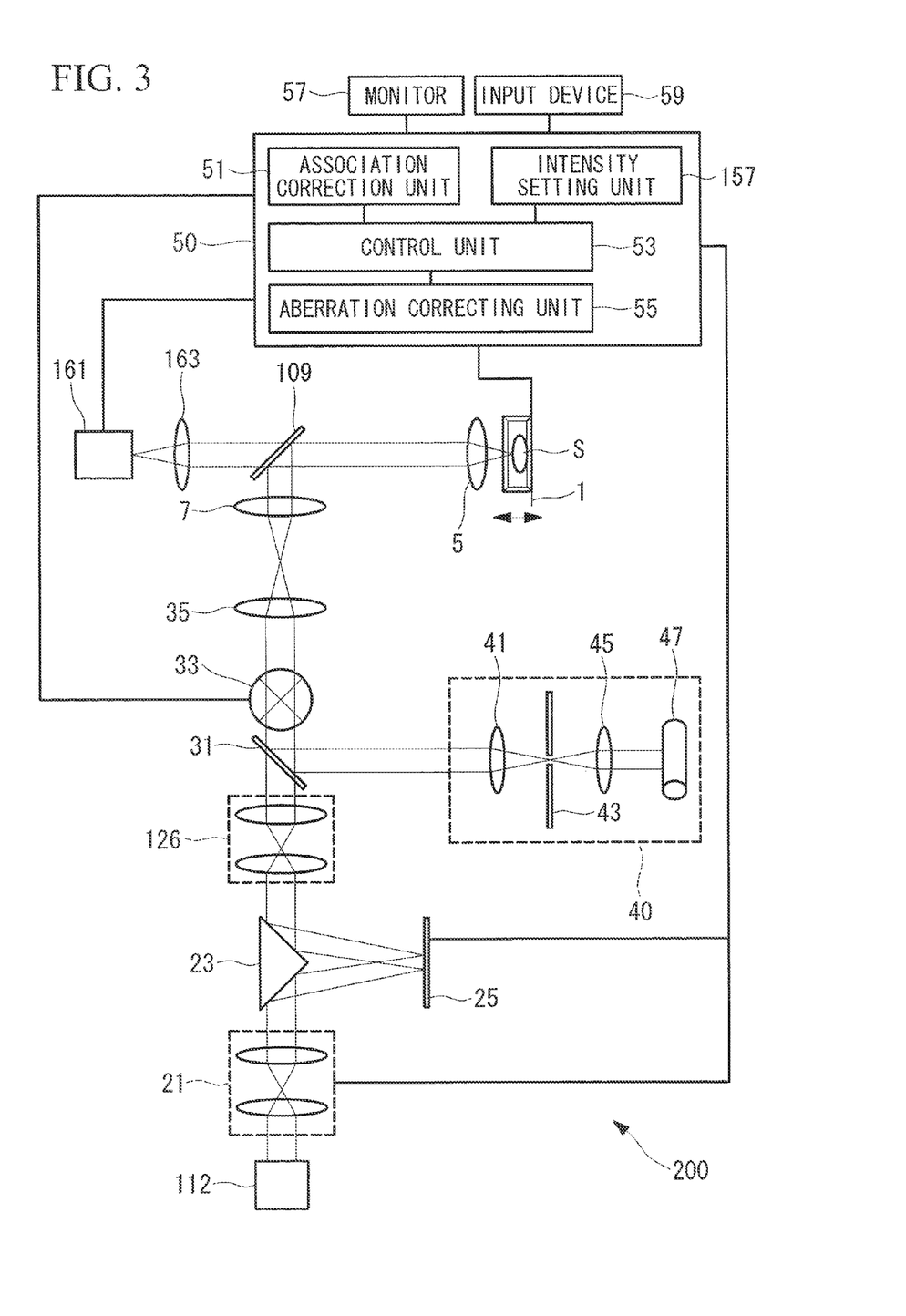
FIG. 3 is a schematic diagram of the configuration of a laser microscope according to a modification of the second embodiment of the present invention.
Figure 4:
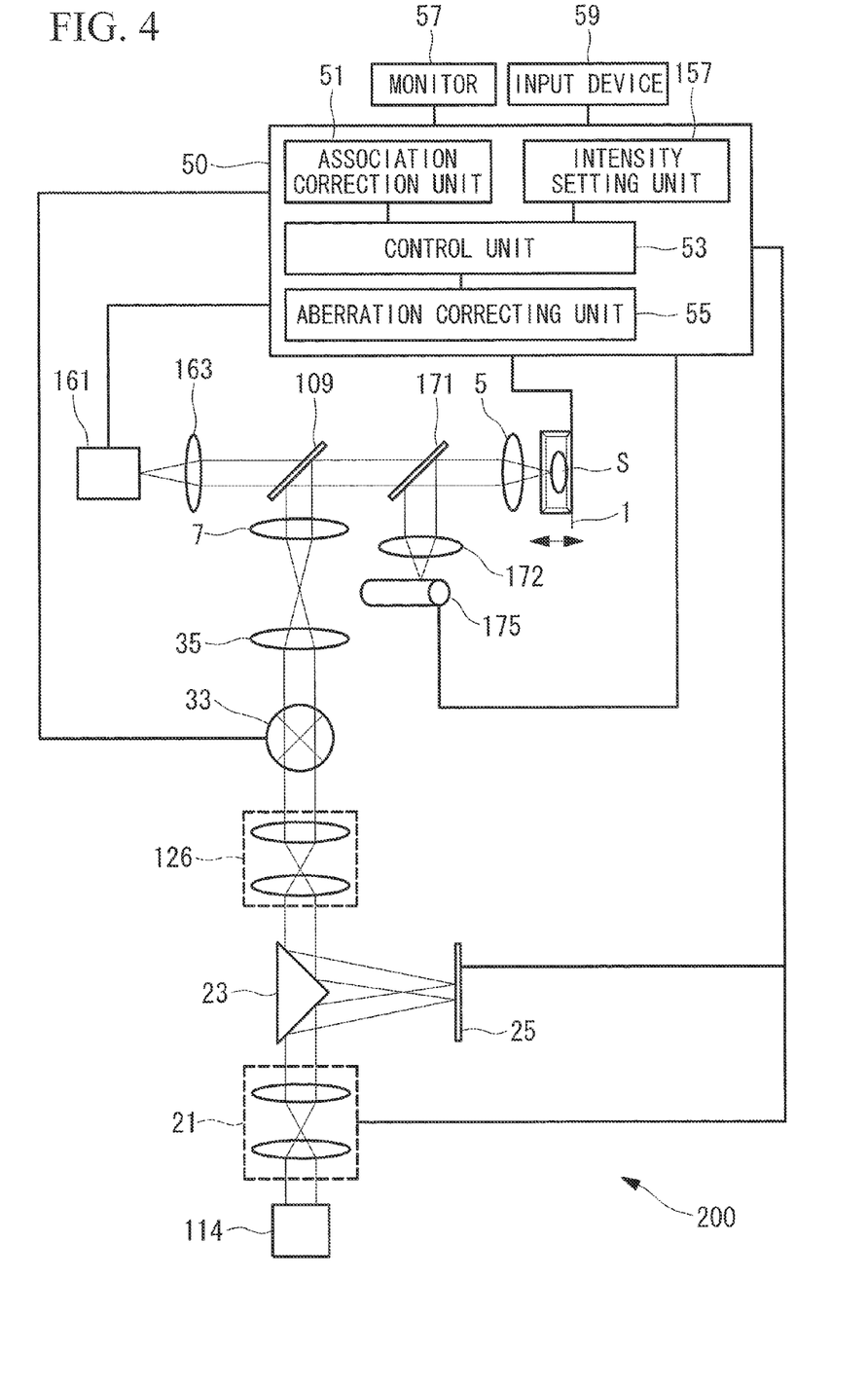
FIG. 4 is a schematic diagram of the configuration of a laser microscope according to another modification of the second embodiment of the present invention.

Although the optical path of the observation optical system 30 and the optical path of the stimulation optical system 20 are separately provided in this embodiment, instead of this, the observation optical system 30 and the stimulation optical system 20 may share the same optical path, as shown in, for example, FIGS. 3 and 4.

More specifically, as shown in FIG. 3, the laser microscope 200 may include a laser light source 112 that emits a laser beam, instead of the laser light source portion 10. The observation optical system and the stimulation optical system may include the beam expander 21, the right-angled prism 23, the LCOS-SLM 25, a relay optical system 126 that relays the laser beam reflected again by the right-angled prism 23, the dichroic mirror 31, the galvanometer mirror 33, the pupil projection lens 35, and the detection optical system 40. In this case, when the specimen S is observed, the prism 23 in the optical path of the laser beam may be removed, or the LCOS-SLM 25 may be controlled such that it does not perform phase modulation.

Furthermore, as shown in FIG. 4, the laser microscope 200 may include a laser light source 114 that emits IR pulsed laser light that causes multiphoton excitation in the specimen S, instead of the laser light source portion 10. The observation optical system and the stimulation optical system may be composed of the beam expander 21, the right-angled prism 23, the LCOS-SLM 25, the relay optical system 126 that relays the laser beam reflected again by the right-angled prism 23, the galvanometer mirror 33, and the pupil projection lens 35. In addition, the laser microscope 200 may include a dichroic mirror 171 that reflects fluorescence coming from the specimen S, a condenser lens 172 that condenses the fluorescence reflected by the dichroic mirror 171, and a PMT 175 that detects the fluorescence condensed by the condenser lens 172. In this case too, when the specimen S is observed, the prism 23 in the optical path of the laser beam is removed, or the LCOS-SLM 25 is controlled such that it does not perform phase modulation.

Third Embodiment

Next, a laser microscope according to a third embodiment of the present invention will be described.

Figure 5:
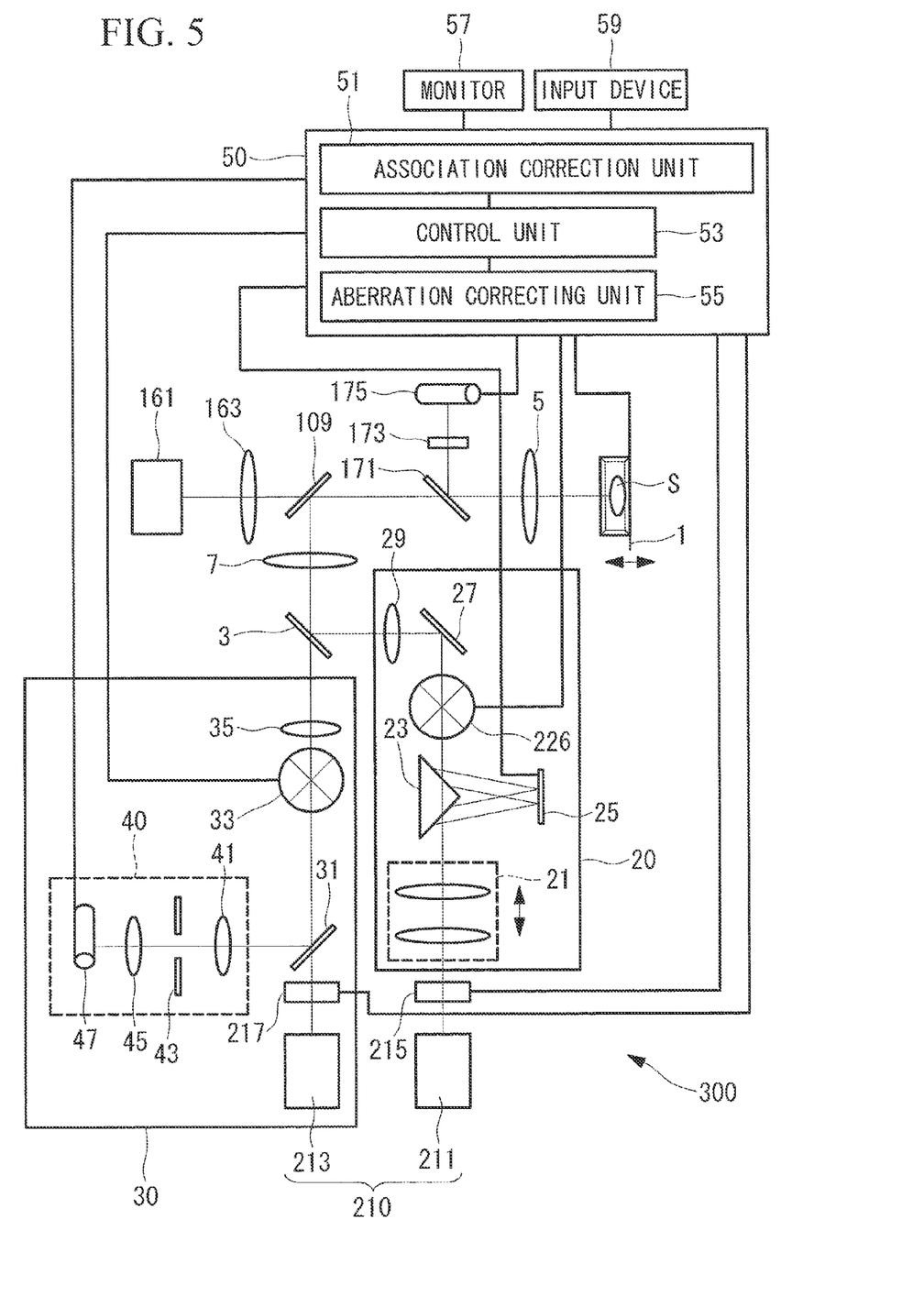
FIG. 5 is a schematic diagram of the configuration of a laser microscope according to a third embodiment of the present invention.

As shown in FIG. 5, a laser microscope 300 according to this embodiment differs from that according to the first and second embodiments in that it includes, instead of the laser light source portion 10, a laser light source portion 210 having laser light sources 211 and 213 that emit laser beams, acousto-optic modulators (AOMs) 215 and 217 that control the transmittance of the laser beams emitted from the laser light sources 211 and 213, a galvanometer mirror (stimulation-beam scanning unit) 226 that scans the stimulation beam incident on the mirror 27 across the specimen S, the dichroic mirror 171 that reflects fluorescence coming from the specimen S, a cut filter 173 that removes light having the excitation wavelength from the fluorescence reflected by the dichroic mirror 171, and the PMT 175 that detects the fluorescence passing through the cut filter 173.

Hereinbelow, portions having the same configurations as those of the laser microscope 100 according to the first embodiment or the laser microscope 200 according to the second embodiment will be denoted by the same reference numerals, and descriptions thereof will be omitted.

The laser light sources 211 and 213 each emit IR pulsed laser light (laser beam) that causes multiphoton excitation in the specimen S.

The AOMs 215 and 217 for controlling the transmittance are connected to the control device 50.

The PMT 47 is connected to the control unit 53.

In this embodiment, the control unit 53 can form an image on the basis of the swivel angles of the galvanometer mirror 226, the position of the stage 1, and the intensity of the laser beam.

The depth range in the X, Y, and Z directions scanned by the stimulation optical system 20 is from the bottom surface to the top surface of the specimen S, whose thickness is accurately known in advance.

In this embodiment, the association correction unit 51 can calculate, set, and store a control value such that the target value of the position, in the depth direction, of the laser beam from the stimulation optical system 20 as a result of the phase modulation by the LCOS-SLM 25 is equal to the thickness of the specimen S. Thus, the association correction unit 51 can associate the position in the depth direction of the laser beam radiated from the stimulation optical system 20 and the control, in the Z direction, of the observation area observed by the observation optical system 30.

The operation of the thus-configured laser microscope 300 according to this embodiment will be described.

The laser beam emitted from the laser light source 211, after the transmittance thereof is controlled by the AOM 215, is made to enter the optical path shared with the observation optical system 30 by the optical-path combining portion 3 via the galvanometer mirror 226 of the stimulation optical system 20. Furthermore, the laser beam emitted from the laser light source 213, after the transmittance thereof is controlled by the AOM 217, is made to enter the optical path shared with the stimulation optical system 20 by the optical-path combining portion 3 via the galvanometer mirror 33 of the observation optical system 30.

The laser beams entering the shared optical path are reflected by the half mirror 109, pass through the dichroic mirror 171, and are radiated onto the specimen S by the objective lens 5. When two-photon fluorescence is generated in the specimen S upon irradiation with the laser beams, the fluorescence is collected by the objective lens 5, returns along the optical path in the opposite direction, is reflected by the dichroic mirror 171, passes through the cut filter 173, and is detected by the PMT 175.

In this embodiment, the laser beam emitted from the laser light source 211 is radiated onto the specimen S by the stimulation optical system 20, the resulting fluorescence coming from the specimen S is detected by the PMT 175, and an XYZ image of the specimen is formed by the control unit 53. Herein, scanning of the laser beam in the X and Y directions is performed by the galvanometer mirror 226, and movement of the laser beam in the Z direction is performed by means of the phase modulation by the LCOS-SLM 25. At this time, multi-point illumination is not performed. That is, the LCOS-SLM 25 is used only to move the position irradiated with the laser beam in the optical axis direction.

In this case, the association correction unit 51 sets a control value such that the target value of the position, in the depth direction, of the laser beam as a result of the phase modulation by the LCOS-SLM 25 equals the thickness of the specimen S, and the control value is associated with the Z-direction control performed by the observation optical system 30. Thus, it is possible to associate the movement, in the depth direction, of the observation area observed with the observation optical system 30 and the movement of the stimulation site in the depth direction as a result of the phase modulation by the LCOS-SLM 25. In addition, by moving in the Z direction while swiveling the galvanometer mirror 226 in the X and Y directions, accurate correction in the Z direction can be made, regardless of the position thereof in the X and Y directions.

Although correction in the Z direction is performed in this embodiment, instead of this, for example, a specimen having a three-dimensional known shape (hereinbelow, "three-dimensional grid specimen), such as a collection of fine cubes having fluorescent beads at the apexes, may be used. Then, a three-dimensional image of the three-dimensional grid specimen, in which multiphoton excitation is caused by scanning a laser beam in the X, Y, and Z directions by means of the phase modulation by the LCOS-SLM 25, may be acquired. With this configuration, correction in three, i.e., X, Y, and Z, directions can be performed by controlling the phase modulation performed by the LCOS-SLM 25.

Although the embodiments of the present invention have been described in detail above with reference to the drawings, the detailed configurations thereof are not limited to these embodiments and include design changes within a scope not departing from the spirit of the present invention. For example, the present invention may be applied not only to the above-described embodiments, but also to embodiments achieved by appropriately combining the above-described embodiments; it is not specifically limited.

REFERENCE SIGNS LIST

3: optical-path combining portion
5: objective lens
10, 112, 114, 210: laser light source portion (laser light source)
20: stimulation optical system
25: LCOS-SLM (spatial light modulator)
30: observation optical system
33: galvanometer mirror (scanning unit)
40: PMT (detecting unit)
51: association correction unit
53: control unit (image forming unit, position setting unit)
55: aberration correcting unit
100, 200, 300: laser microscope
157: intensity setting unit
161: CCD camera (specimen-image acquisition unit)
226: galvanometer mirror (stimulation-beam scanning unit)

The invention claimed is:

1. A laser microscope comprising:
an objective lens that radiates a laser beam emitted from a laser light source onto a specimen;
a stimulation optical system having a phase-modulating spatial light modulator that is located at a position optically conjugate with a pupil position of the objective lens and modulates the phase of the laser beam emitted from the laser light source;
an observation optical system having a scanning unit that scans the laser beam emitted from the laser light source, serving as observation illuminating light, across the specimen and a detecting unit that detects the observation light coming from the specimen and collected by the objective lens;
an image forming unit that forms a three-dimensional image of the specimen from observation images of different observation planes in the optical axis direction, acquired by the observation optical system; and
a position setting unit that sets stimulation sites in the specimen to be irradiated with the laser beam serving as a stimulation beam by the stimulation optical system at a plurality of different positions in the optical axis direction, in the three-dimensional image formed by the image forming unit,
wherein the spatial light modulator modulates the laser beam such that the stimulation sites set by the position setting unit are irradiated with the laser beam.

2. The laser microscope according to claim 1, further comprising an association correction unit that controls the phase modulation of the laser beam performed by the spatial light modulator such that an irradiation pattern, on the specimen, of the laser beam radiated by the stimulation optical system substantially matches a desired irradiation pattern set by the position setting unit.

3. The laser microscope according to claim 2, wherein
the observation optical system or a specimen-image acquisition unit provided separately therefrom acquires an observation image of the specimen irradiated with the laser beam having a predetermined irradiation pattern generated by the spatial light modulator, and
the association correction unit controls the phase modulation of the laser beam performed by the spatial light modulator so as to cancel a difference between the predetermined irradiation pattern radiated onto the specimen and the irradiation pattern on the acquired observation image.

4. The laser microscope according to claim 1, further comprising an aberration correcting unit that controls the phase modulation of the laser beam performed by the spatial light modulator so as to correct aberrations of the objective lens, aberrations of an optical system disposed between the objective lens and the spatial light modulator, and/or the influence of a refractive index mismatch of the specimen.

5. The laser microscope according to claim 1, wherein
a stimulation light path of the stimulation optical system in which the spatial light modulator is disposed and an observation light path of the observation optical system in which the scanning unit is disposed are separately provided, and
the laser microscope further comprises an optical-path combining portion that combines the stimulation light path and the observation light path to allow the laser beam emitted from the stimulation optical system and the laser beam emitted from the observation optical system to enter the same objective lens.

6. The laser microscope according to claim 1, further comprising a specimen-image acquisition unit that acquires a two-dimensional image of the specimen by capturing an image of the observation light coming from the specimen and collected by the objective lens.

7. The laser microscope according to claim 2, wherein the association correction unit associates the depth position, in the specimen, of the laser beam radiated by the stimulation optical system and the depth position in the three-dimensional image of the specimen irradiated with the laser beam and acquired by the observation optical system.

8. The laser microscope according to claim 2, wherein
the association correction unit has an association table in which the depth position in the specimen radiated by the stimulation optical system and the depth position in the three-dimensional image of the specimen irradiated with the laser beam and acquired by the observation optical system are associated with each other for each wavelength of the laser beam, and
the phase modulation performed by the spatial light modulator is controlled in accordance with the association table for each wavelength of the laser beam.

9. The laser microscope according to claim 1, further comprising an intensity setting unit that can set the intensity of the laser beam radiated by the stimulation optical system for each of the plurality of stimulation sites set by the position setting unit.

10. The laser microscope according to claim 9, wherein the intensity setting unit adjusts the intensity of the laser beam such that the specimen is stimulated with the same intensity, regardless of the depth of the position irradiated with the laser beam.

11. The laser microscope according to claim 10, wherein the intensity setting unit includes a memory portion that stores an attenuation function according to which the laser beam radiated onto the specimen is attenuated and an output adjustment portion that adjusts the output of the laser light source according to the attenuation function stored in the memory portion.

12. The laser microscope according to claim 10, wherein the intensity setting unit includes a memory portion that stores a table of a scattering coefficient and absorption coefficient of the laser beam with respect to the depth in the specimen and an output adjustment portion that adjusts the output of the laser light source according to the table stored in the memory portion.

13. The laser microscope according to claim 1, wherein the laser light source is an infrared pulsed laser.

14. A laser microscope comprising:
an objective lens that radiates a laser beam emitted from a laser light source onto a specimen;
a stimulation optical system having a stimulation light path in which a phase-modulating spatial light modulator that is located at a position optically conjugate with a pupil position of the objective lens and modulates the phase of the laser beam emitted from the laser light source is disposed;
an observation optical system having an observation light path in which a scanning unit that scans a laser beam emitted from the laser light source, serving as observation illuminating light, across the specimen is disposed and a detecting unit that detects the observation light coming from the specimen and collected by the objective lens;
an optical-path combining portion that combines the stimulation light path and the observation light path to allow the laser beams from the stimulation optical system and the laser beam from the observation optical system to enter the same objective lens;
an image forming unit that forms a three-dimensional image of the specimen from observation images of different observation planes in the optical axis direction, acquired by the observation optical system;
a position setting unit that sets, in the three-dimensional image formed by the image forming unit, stimulation sites in the specimen to be irradiated with the laser beam serving as a stimulation beam by the stimulation optical system at a plurality of different positions in the optical axis direction; and
an association correction unit that controls the phase modulation of the laser beam performed by the spatial light modulator such that an irradiation pattern, on the specimen, of the laser beam radiated by the stimulation optical system substantially matches a desired irradiation pattern set by the position setting unit,
wherein the spatial light modulator modulates the laser beam such that the stimulation sites set by the position setting unit are irradiated with the laser beam.

15. The laser microscope according to claim 14, wherein the stimulation optical system includes a stimulation-beam scanning unit that is provided in the stimulation light path and scans the laser beam serving as the stimulation beam across the specimen.

16. The laser microscope according to claim 14, wherein
the observation optical system activates the scanning unit to detect light from the specimen irradiated with the laser beam in a predetermined irradiation pattern generated by the spatial light modulator, thereby acquiring an observation image of the specimen irradiated with the predetermined irradiation pattern, and
the association correction unit controls the phase modulation of the laser beam performed by the spatial light modulator so as to cancel a difference between the predetermined irradiation pattern radiated onto the specimen and the irradiation pattern on the acquired observation image.

* * * * *